(12) United States Patent
Bell et al.

(10) Patent No.: US 10,868,456 B2
(45) Date of Patent: Dec. 15, 2020

(54) FALSE TOOTH ASSEMBLY FOR GENERATOR STATOR CORE

(71) Applicant: Siemens Energy, Inc., Orlando, FL (US)

(72) Inventors: Shane Bell, Chuluota, FL (US); Randy Edward Whitener, Chuluota, FL (US); Donald Yaffee, Winter Springs, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 247 days.

(21) Appl. No.: 15/994,114

(22) Filed: May 31, 2018

(65) Prior Publication Data
US 2019/0372429 A1 Dec. 5, 2019

(51) Int. Cl.
*H02K 7/116* (2006.01)
*H02K 1/16* (2006.01)
*H02K 3/28* (2006.01)
*H01F 41/30* (2006.01)

(52) U.S. Cl.
CPC ............. *H02K 7/116* (2013.01); *H02K 1/165* (2013.01); *H02K 3/28* (2013.01); *H01F 41/305* (2013.01); *H02K 1/16* (2013.01)

(58) Field of Classification Search
CPC ........ H01F 41/305; H02K 1/16; H02K 1/165; H02K 3/28; H02K 7/11; H02K 7/116
USPC .... 310/216.044, 216.065, 216.088, 216.093, 310/216.098, 216.111; 29/596
See application file for complete search history.

(56) References Cited

U.S. PATENT DOCUMENTS

| 2005/0067915 A1* | 3/2005 | Ida | H02K 41/02 310/216.065 |
| 2005/0198821 A1* | 9/2005 | Reville | B23P 6/00 29/889.1 |
| 2007/0194653 A1* | 8/2007 | Prokscha | H02K 3/522 310/216.023 |
| 2007/0277366 A1 | 12/2007 | Matsuyama et al. | |

(Continued)

FOREIGN PATENT DOCUMENTS

| JP | 2012228087 A | 11/2012 |
| WO | 9929026 A1 | 6/1999 |

OTHER PUBLICATIONS

PCT International Search Report and Written Opinion dated Jul. 24, 2019 corresponding to PCT Application No. PCT/US2019/032655 filed May 16, 2019.

*Primary Examiner* — Tulsidas C Patel
*Assistant Examiner* — Rashad H Johnson

(57) ABSTRACT

A false tooth assembly for a generator stator core is presented. The false tooth assembly has a tapered shape including multiple tapered false tooth pieces. The multiple tapered false tooth pieces are installed into a damaged area in a tooth of a lamination of the stator core such that a wide end of the false tooth assembly is disposed into a wide opening of the damaged area and a narrow end of the false tooth assembly is flushed with a narrow opening of the damaged area at a tip of the tooth. The tapered shape of the false tooth assembly enables the false tooth assembly to fill the entire damaged area and to lock the false tooth assembly into the damaged area. The false tooth assembly can be used to repair stator core in any region of the stator core including step iron region without being dislodged during generator operation.

13 Claims, 3 Drawing Sheets

(56) References Cited

U.S. PATENT DOCUMENTS

| | | | |
|---|---|---|---|
| 2009/0260221 A1* | 10/2009 | Beckford | H02K 15/0006 29/598 |
| 2011/0035940 A1* | 2/2011 | Kight | B23D 43/02 29/889.1 |
| 2013/0113332 A1* | 5/2013 | Saito | H02K 3/48 310/214 |
| 2014/0024765 A1 | 1/2014 | Nunoshige et al. | |
| 2014/0217837 A1* | 8/2014 | Jaganjac | H02K 1/18 310/45 |
| 2016/0308424 A1* | 10/2016 | Marshall | H02K 3/487 |
| 2017/0259514 A1* | 9/2017 | Chen | B64F 5/40 |

* cited by examiner

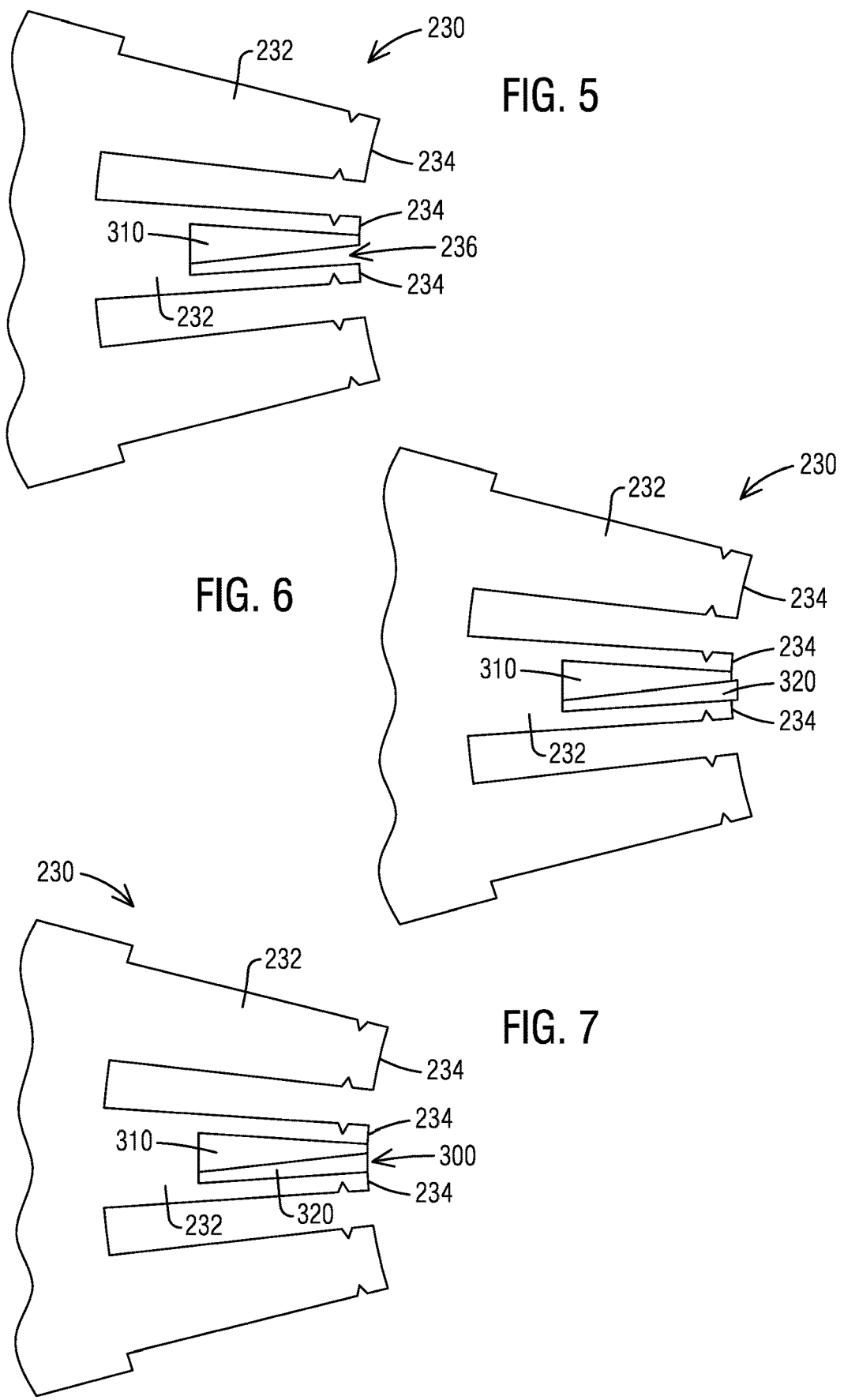

FALSE TOOTH ASSEMBLY FOR GENERATOR STATOR CORE

TECHNICAL FIELD

The present invention relates generally to a false tooth assembly for a stator core of a generator.

DESCRIPTION OF RELATED ART

A generator is a component in power generation industry that converts mechanical power to electrical power. A generator typically includes a stator and a rotor. A generator stator may employ a stator core comprised a plurality of axially extending slots along an internal circumference of the stator core. Stator windings are placed in the slots with insulation from the stator core. A rotor may be installed within the stator core.

A stator core may consist of a plurality of packs of stacked thin metal laminations. Inner portion of the laminations may have a tooth shape having a plurality of teeth. During generator operation, the laminations may be damaged by variety causes, such as by high local temperatures, also known as local hot spots, or by foreign objects. The damage may occur in the tooth region. A false tooth may be installed into an area where lamination teeth are partial or fully damaged. The false tooth need to remain in the area without being dislodged during generator operation.

There are several ways to lock the false tooth in place. Stator core slot wedge may be used to mechanically lock the false tooth in place. Epoxy glue may also be used to lock the false tooth in place, especially in a region of the stator core where the stator core slot wedge is not available, such as step iron region. The concern with applying false tooth into stator core of generator is that how long the false tooth will remain in place and function as intended during generator operation. There is a need to provide an easy and simple way to lock the false tooth in place in any region of the stator core.

SUMMARY OF INVENTION

Briefly described, aspects of the present invention relate to a stator core of a generator, a method for repairing a stator core of a generator, and a false tooth assembly for a stator core of a generator.

According to an aspect, a stator core of a generator is presented. The stator core comprises a lamination comprising a tooth. The stator core comprises a false tooth assembly configured to be installed into a damaged area of the lamination. The damaged area comprises a cutout starting from a tip of the tooth and radially extending into the lamination. The false tooth assembly comprises a tapered shape. The tapered shape of the false tooth assembly is configured to enable the false tooth assembly to fill the damaged area and to lock the false tooth assembly into the damaged area.

According to an aspect, a method for repairing a stator core of a generator is presented. The stator core comprises a lamination comprising a tooth. The lamination comprises a damaged area. The damaged area comprises a cutout starting from a tip of the tooth and radially extending into the lamination. The method comprises providing a false tooth assembly. The method comprises installing the false tooth assembly into the damaged area. The false tooth assembly comprises a tapered shape. The tapered shape of the false tooth assembly is configured to enable the false tooth assembly to fill the damaged area and to lock the false tooth assembly into the damaged area.

According to an aspect, a false tooth assembly for a stator core of a generator is presented. The stator core comprises a lamination comprising a tooth. The lamination comprises a damaged area. The damaged area comprises a cutout starting from a tip of the tooth and radially extending into the lamination. The false tooth assembly comprises a plurality of tapered false tooth pieces. The plurality of tapered false tooth pieces is configured to be assembled together to form the false tooth assemble. The false tooth assemble comprises a tapered shape. The tapered shape of the false tooth assembly is configured to enable the false tooth assembly to fill the damaged area and to lock the false tooth assembly into the damaged area.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings:

FIGS. 5 to 7 illustrate a sequence of schematic partial plan views of a lamination illustrating steps of installing a false tooth assembly into a damaged area of the lamination according to embodiments of the present invention.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
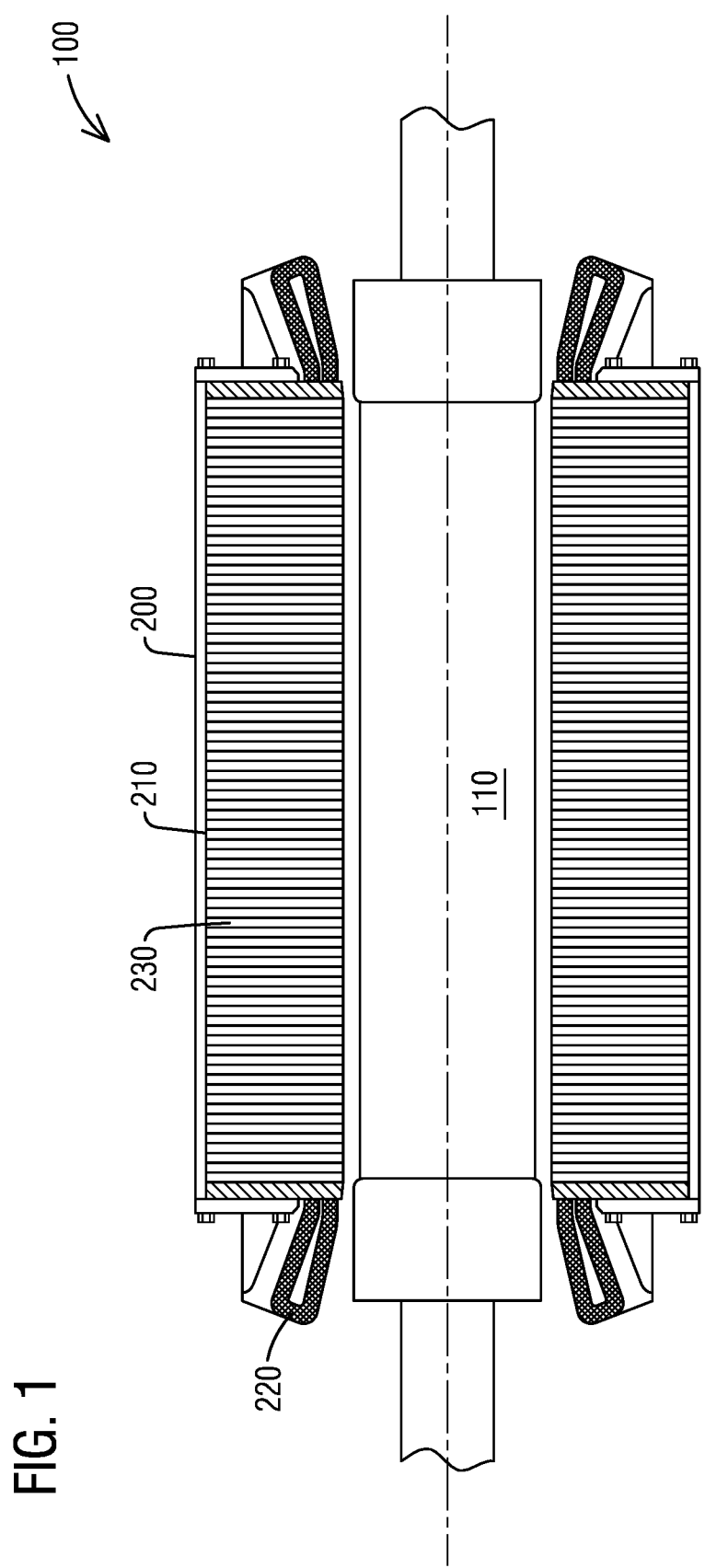
FIG. 1 illustrates a schematic cross section view of a generator in which embodiments of the present invention may be implemented.

FIG. 1 illustrates a schematic cross section view of a generator 100. The generator 100 includes a rotor 110 and a stator 200. The stator 200 has a stator core 210. The rotor 110 is installed within the stator core 210. A stator winding 220 may be arranged within the stator core 210. The stator core 210 may be comprised of a plurality of stacked thin metal laminations 230.

Figure 2:
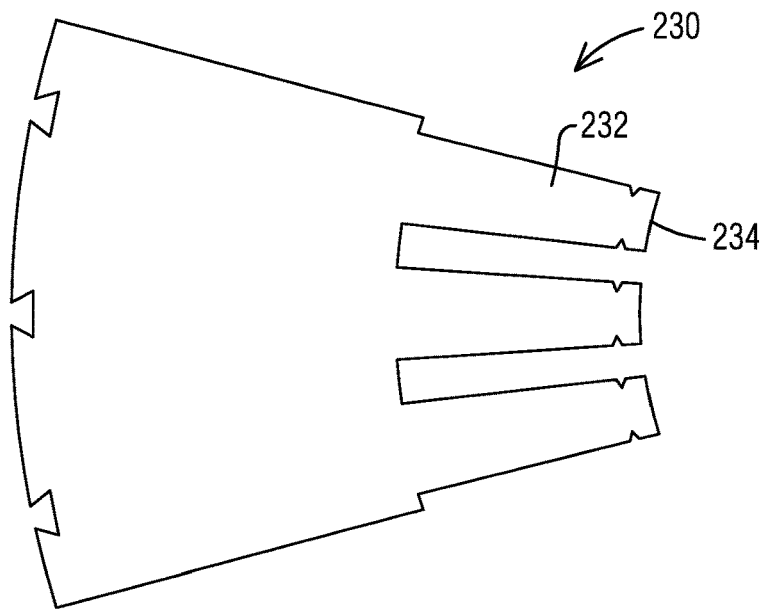
FIG. 2 illustrates a schematic plan view of a lamination of which embodiments of the present invention may be implemented.

FIG. 2 illustrates a schematic plan view of a lamination 230. As shown in FIG. 2, an inner region of the lamination 230 has a tooth shape comprised of a plurality of tooth 232. The tooth 232 has a tapered shape tapering down to the tip 234 of the tooth 232. Typically, damage of the lamination 230 occurs near an area of the tooth 232 of the lamination 230, more likely, from the tip 234 of the tooth 232. The damage may be caused by variety reasons, such as by high local temperatures, also known as local hot spots, or by foreign objects.

Figure 3:
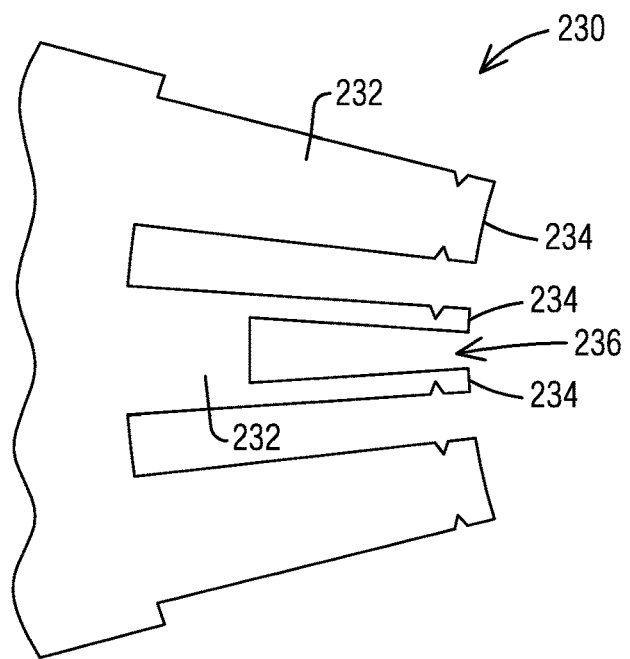
FIG. 3 illustrates a schematic partial plan view of a lamination having a damaged area in which embodiments of the present invention may be implemented.

FIG. 3 illustrates a schematic partial plan view of a lamination 230 with a tooth 232 having a damaged area 236. As shown in FIG. 3, the damaged area 236 is a partial cutout of the tooth 232 starting from the tip 234 of the tooth 232 and radially extending into the lamination 230. For illustration purpose, the damaged area 236 shown in FIG. 3 has a tapered shape having a narrow opening at the tip 234 and a wide opening as the damaged area 236 radially extending deeper into the lamination 230. It is understood that the damaged area 236 may have any shapes. The damaged area 236 of the lamination 230 needs to be repaired to ensure normal operation of the generator 100.

A false tooth may be inserted into the damaged area 236 of the tooth 232 of the lamination 230. The false tooth needs to remain in the damaged area 236 without being dislodged during generation operation. In a region of the stator core 210 where a stator core slot wedge is available, the stator core slot wedge may be used to mechanically lock the false tooth in place. In a region of the stator core 210 where a stator core slot wedge is not available, such as in a step iron region, epoxy glue may be used to lock the false tooth in place. The concern may exist that how long the false tooth may remain in the damaged area 236 and function as intended during generator operation after applying the false tooth into the damaged area 236 of the lamination 230 in the stator core 210.

Figure 4:
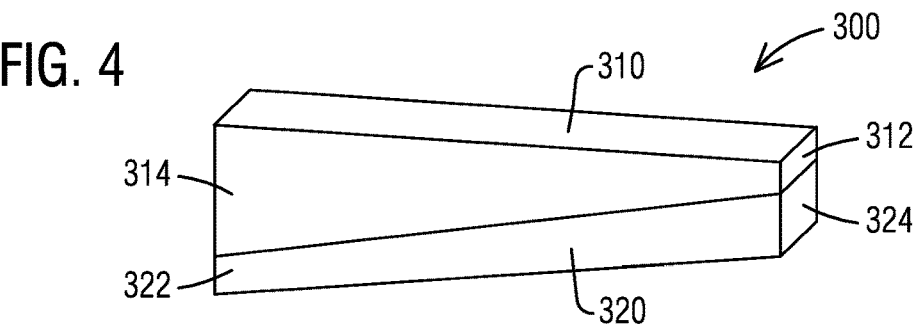
FIG. 4 illustrates a schematic perspective view of a false tooth assembly to be inserted into a damaged area of a lamination according to embodiments of the present invention.

FIG. 4 illustrates a schematic perspective view of a false tooth assembly 300 to be installed into the damaged area 236 of the tooth 232 of the lamination 230 according to an embodiment of the present invention. As shown in FIG. 4, the false tooth assembly 300 may include a first false tooth 310 and a second false tooth 320. The first false tooth 310 and the second false tooth 320 have a block rail shape. The first false tooth 310 has a tapered shape having a narrow end 312 and a wide end 314. The second false tooth 320 has a tapered shape having a narrow end 322 and a wide end 324. The tapered first false tooth 310 and the tapered second false tooth 320 are assembled together in a way that the narrow end 312 of the first false tooth 310 aligns with the wide end 324 of the second false tooth 320 and the wide end 314 of the first false tooth 310 aligns with the narrow end 322 of the second false tooth 320. The false tooth assembly 300 may have a shape that corresponds to a shape of the damaged area 236 of the lamination 230. For example, the false tooth assembly 300 may have a tapered shape to fill a tapered shaped damaged area 236 that enables the false tooth assembly 300 to fill the entire damaged area 236 and locking the false tooth assembly 300 in the damaged area 236 in a dovetail locking configuration. For illustration purpose, the false tooth assembly 300 shown in FIG. 4 has a narrow end comprised of the narrow end 312 of the first false tooth 310 and the wide end 324 of the second false tooth 320. The false tooth assembly 300 has a wide end comprised of the wide end 314 of the first false tooth 310 and the narrow end 322 of the second false tooth 320. The first false tooth 310 and the second false tooth 320 may include any suitable materials, such as epoxy resins, micas, fiber glasses, etc. For illustration purpose, the false tooth assembly 300 in FIG. 4 includes two false tooth pieces 310 and 320. It is understood that the false tooth assembly 300 may include a single tapered false tooth or any numbers of tapered false tooth pieces.

FIGS. 5 to 7 illustrate a sequence of schematic partial plan views of a lamination 230 illustrating steps of installing the false tooth assembly 300 into the damaged area 236 of the lamination 230 in the stator core 210 according to an embodiment of the present invention. As shown in FIG. 5, the first false tooth 310 is installed into the damaged area 236 first. The first false tooth 310 is installed in a way such that the wide end 314 of the first false tooth 310 is disposed into the damaged area 236 toward the wide opening of the damaged area 236. The narrow end 312 of the first false tooth 310 is aligned with the tip 234 of the tooth 232. Prior to installation, the first false tooth 310 may be wrapped in glue on sides that contact the lamination 230 so that the first false tooth 310 may be secured to the lamination 230 after installation. Side of the first false tooth 310 that interfaces the second false tooth 320 to be installed secondly may also be wrapped in glue prior to installation to ensure a tight assembly with the second false tooth 320 after installation. The glue may include any suitable glues, such as impregnation resins, Dacron™, Nomex™, resin-impregnated Dacron™, resin-impregnated Nomex™, etc.

As shown in FIG. 6, the second false tooth 320 is then installed into the damaged area 236. The second false tooth 320 is installed in a way such that the narrow end 322 is disposed into the damaged area 236 toward the wide opening of the damaged area 236. The narrow end 322 of the second false tooth 320 aligns with the wide end 314 of the first false tooth 310. The second false tooth 320 may be installed into the damaged area 236 using a tool for a tight assembly. The tool may be a hand tool, or a power-driven tool. The second false tooth 320 may be longer than a radial length of the damaged area 236 of the tooth 232 to ensure a tight assembly. Prior to installation, the second false tooth 320 may be wrapped in glue on sides that contact the lamination 230 so that the second false tooth 320 may be secured to the lamination 230 after installation. Side of the second false tooth 320 that interfaces the first false tooth 310 may be wrapped in glue prior to installation to ensure a tight assembly with the first false tooth 310 after installation. The glue may include any suitable glues, such as impregnation resins, Dacron™, Nomex™ resin-impregnated Dacron™, resin-impregnated Nomex™, etc.

As shown in FIG. 7, the false tooth assembly 300 is fully assembled in the damaged area 236 of the tooth 232. Portion of the second false tooth 320 that extends out of the tip 234 of the tooth 232 is cut at the tip 234 so that the false tooth assembly 300 is flushed with the tip 234 of the tooth 232. The false tooth assembly 300 has a tapered shape. The first false tooth 310 and the second false tooth 320 are assembled together in the damaged area 236 in a way such that a wide end of the tapered false tooth assembly 300 is disposed into a wide opening of the damaged area 236 extending into the lamination 230 and a narrow end of the tapered false tooth assembly 300 is flushed with a narrow opening of the damaged area 236 at the tip 234 of the tooth 232. The tapered false tooth assembly 300 enables the false tooth assembly 300 to fill the entire damaged area 236 of the lamination 230. The tapered false tooth assembly 300 enables the false tooth assembly 300 to be locked in the damaged area 236 in a dovetail locking configuration. Sides of the first false tooth 310 and the second false tooth 320 that contact the lamination 230 may be wrapped in glue prior to installation so that the false tooth assembly 300 may be secured to the lamination 230. Side of the first false tooth 310 and side of the second false tooth 320 that interface each other may also be wrapped in glue to ensure a tight assembly of the false tooth assembly 300.

Prior to installation of the false tooth assembly 300, a pressure on the lamination 230 may be relieved to allow a room for an easy installation of the false tooth assembly 300. For example, ventilation spacers on the lamination 230 may be machined down to some extent to relieve the pressure on the lamination 230. The ventilation spacers on the lamination 230 may be machined down to, such as 3 to 5 inches (7.62 to 12.7 cm). Ventilation spacer replacements may be installed back on the lamination 230 after installation of the false tooth assembly 300 to restore the pressure on the lamination 230. The ventilation spacer replacements may be tightly fitted and secured on the lamination 230, such as by glue.

A test may be performed to the stator core 210 prior to installation of the false tooth assembly 300 to identify any other potential damages of the stator core 210. A test may also be performed to the stator core 210 after installation of the false tooth assembly 300 to ensure that the damaged area 236 is properly repaired. The test may include any suitable tests known in the industry, such as a loop test.

According to an aspect, the proposed false tooth assembly 300 fills the damaged area 236 in the stator core 210 and remains in the damaged area 236 without being dislodged during operation of the generator 100. The proposed false tooth assembly 300 has a tapered shape that allows the false tooth assembly 300 to fill the entire damaged area 236 and to be locked into the damaged area 236 in a dovetail locking configuration. The false tooth assembly 300 may include single tapered false tooth or multile tapered false tooth pieces.

According to an aspect, the propose false tooth assembly 300 may be used to repair a damaged area 236 of a stator core 210 of a generator 100 in a region of the stator core 210 where a stator slot wedge is available. The propose false tooth assembly 300 may be used to repair a damaged area 236 of a stator core 210 of a generator 100 in a region of the stator core 210 where a stator slot wedge is not available, such as a step iron region. The proposed false tooth assembly 300 provides an easy and simple way to repair a stator core 210 of a generator 100 in any region of the stator core 210 without disassembling and reassembling the stator core 210. The proposed false tooth assembly 300 provides significantly cost savings and significantly increase efficiency for maintenance of a generator 100.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator
110: Rotor
200: Stator
210: Stator Core
220: Stator Winding
230: Lamination
232: Lamination Tooth
234: Tooth Tip
236: Damaged Area
300: False Tooth Assembly
310: First False Tooth
312: Narrow End of First False Tooth
314: Wide End of First False Tooth
320: Second False Tooth
322: Narrow End of Second False Tooth
324: Wide End of Second False Tooth

What is claimed is:

1. A false tooth assembly for a stator core of a generator, wherein the stator core comprises a lamination comprising a tooth, wherein the lamination comprises a damaged area, wherein the damaged area comprises a cutout starting from a tip of the tooth and radially extending into the lamination, the false tooth assembly comprising:
a plurality of tapered false tooth pieces comprising a first false tooth having a tapered shape and a second false tooth having a tapered shape,
wherein the plurality of tapered false tooth pieces is configured to be assembled together to form the false tooth assembly,
wherein the false tooth assembly comprises a tapered shape, and
wherein the tapered shape of the false tooth assembly is configured to enable the false tooth assembly to fill the damaged area and to lock the false tooth assembly into the damaged area.

2. A stator core of a generator comprising:
a lamination comprising a tooth; and
a false tooth assembly according to claim 1 configured to be installed into a damaged area of the lamination,
wherein the damaged area comprises a cutout starting from a tip of the tooth and radially extending into the lamination,
wherein the false tooth assembly comprises said tapered shape,
wherein the tapered shape of the false tooth assembly is configured to enable the false tooth assembly to fill the damaged area and to lock the false tooth assembly into the damaged area, and
wherein the plurality of tapered false tooth pieces are assembled together in the damaged area such that a wide end of the tapered false tooth assembly is disposed into a wide opening of the damaged area and a narrow end of the tapered false tooth assembly is flush with a narrow opening of the damaged area at the tip of the tooth.

3. The stator core as claimed in claim 2, wherein the tapered false tooth assembly is locked into the damaged area in a dovetail looking configuration.

4. The stator core as claimed in claim 2, wherein sides of at least one of the plurality of tapered false tooth pieces contacting the lamination is wrapped in glue.

5. The stator core as claimed in claim 2, wherein a side of the second false tooth interfacing the first false tooth is wrapped in glue.

6. The stator core as claimed in claim 2, wherein the false tooth assembly comprises an epoxy resin.

7. A method for repairing a stator core of a generator, wherein the stator core comprises a lamination comprising a tooth, wherein the lamination comprises a damaged area, wherein the damaged area comprises a cutout starting from a tip of the tooth and radially extending into the lamination, the method comprising:

provrding a false tooth assembly according to claim 1; and installing a false tooth assembly according to claim 1 into the damaged area, the installing comprising:

inserting wide end side of the first false tooth into the damaged area; and inserting the remaining plurality of tapered false tooth pieces into the damaged area, wherein the tapered shape of the false tooth assembly locks the false tooth assembly into the damaged area, and wherein the plurality of tapered false tooth pieces are assembled together in the damaged area such that a wide end of the tapered false tooth assembly is disposed into a wide opening of the damaged area and a narrow end of the tapered false tooth assembly is flush with a narrow opening of the damaged area at the tip of the tooth.

8. The method as claimed in claim 7, wherein the false tooth assembly comprises a second false tooth having a tapered shape, and wherein the installing step comprises installing the second false tooth into the damaged area after installing the first false tooth having a narrow end of the second false tooth disposed into the damaged area.

9. The method as claimed in claim 8, wherein the second false tooth is longer than a radial length of the damaged area, and wherein the method further comprises cutting the second false tooth at the tip of the tooth after installing into the damaged area.

10. The method as claimed in claim 7, further comprising wrapping sides of the first false tooth contacting the lamination in glue prior to installing.

11. The method as claimed in claim 8, further comprising wrapping sides of the second false tooth contacting the lamination in glue prior to installing.

12. The method as claimed in claim 7, further comprising relieving a pressure on the lamination prior to installing the false tooth assembly.

13. The method as claimed in claim 12, further comprising restoring the pressure on the lamination after installing the false tooth assembly.

\* \* \* \* \*